Patented Mar. 11, 1930

1,749,955

UNITED STATES PATENT OFFICE

WALTER MIEG, OF OPLADEN, AND RUDOLF HEIDENREICH, OF LEVERKUSEN-ON-THE-RHINE, GERMANY, ASSIGNORS TO GENERAL ANILINE WORKS, INC., OF NEW YORK, N. Y., A CORPORATION OF DELAWARE

NEW CONDENSATION PRODUCT OF THE PERIMIDONE SERIES

No Drawing. Application filed June 18, 1928, Serial No. 286,481, and in Germany December 16, 1925.

The present invention relates to new condensation products of the perimidone series and to a process of preparing same.

When reacting upon perimidone of the probable formula:

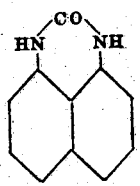

with an organic carboxylic acid halide, such as an aroylchloride, chloropropionylchloride, etc., with or without the addition of an inert organic solvent at elevated temperature, compounds are obtainable which probably are acyl derivatives of the perimidone. When working in the presence of inert organic solvents it may be advantageous to add anhydrous aluminiumchloride to the reaction mixture, whereby similar products are obtained, which probably are isomeric to those obtainable without the addition of aluminiumchloride. Now we have found that when reacting upon these compounds with anhydrous aluminiumchloride advantageously in the presence of a suitable alkali metal chloride, such as potassiumchloride or sodiumchloride, (whereby in the latter cases a temperature of about 150-170° C. may be a suitable one), until samples of the melts no more change in color when dissolved in strong sulfuric acid, new condensation products are obtainable, which crystallize from suitable high boiling organic solvents in yellow to red crystals, difficulty soluble in the usual organic solvents, soluble in strong sulfuric acid with yellow to red colorations, in the most cases with a powerful yellowish-green or red fluorescence.

The following examples illustrate our invention, without limiting it thereto:

Example 1.—1 part by weight of perimidone is boiled with 4 parts by weight of benzoylchloride for about 3-4 hours until a green solution is obtained from which, when cooled, a compound of the probable formula

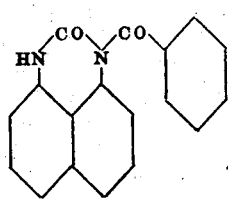

crystallizes in yellow needles which may be recrystallized from nitro-benzene. Golden-yellow needles are thus obtained which melt above 300° C. The product dissolves in strong sulfuric acid with a blueish red coloration, in caustic alkali solutions with the addition of a small amount of ethylalcohol with a yellow shade. The benzoylation as described above may also be performed in the presence of a suitable inert organic solvent, such as nitro-benzene, o-dichlorobenzene etc.

1 part by weight of the benzoylperimidone described above is introduced at about 120-130° C. into a mixture of 4 parts by weight of anhydrous aluminium chloride and one part by weight of sodiumchloride, after which the melt is heated up to about 160° C. until samples no more change in color when dissolved in strong sulfuric acid. The cooled melt is worked up by means of diluted hydrochloric acid in the usual manner and the reaction product thus obtainable is recrystallized from nitrobenzene whereby yellow needles separate, soluble in strong sulfuric acid with a yellow coloration and with a strong green fluorescence, visible still in a solution of about one part by weight of the product in ten million parts by weight of sulfuric acid.

Probably the product corresponds to the formula:

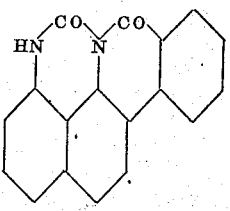

*Example 2.*—18.4 parts by weight of perimidone and 15 parts by volume of benzoylchloride are boiled for about 4 hours in 200 parts by volume of carbon disulfide with the addition of 15 parts by weight of aluminium chloride. When working up in the usual manner a yellow compound is obtained, which crystallizes from nitrobenzene or o-dichlorobenzene in yellow prismatical needles melting at about 290° C. (uncorrected). The product dissolves in strong sulfuric acid with a yellowish red coloration and is probably isomeric with the product described in the first parts of Example 1.

When reacting upon this product with a mixture of anhydrous aluminiumchloride and sodiumchloride according to the directions given in Example 1, a product is obtained which dissolves in strong sulfuric acid with a more red coloration and with less fluorescence than that described in Example 1.

*Example 3.*—37 parts by weight of perimidone are finely grinded with 30 parts by weight of anhydrous aluminiumchloride, suspended in 150 parts by volume of carbon disulfide and to this suspension a solution of 40 parts by weight of α-naphthoylchloride in 50 parts by volume of carbon disulfide is allowed to run in slowly. Reaction takes place simultaneously but the reaction mixture is still boiled for about 4 hours until no hydrochloric acid is any more evolved. By working up in the usual manner a condensation product is obtained which crystallizes from nitrobenzene in yellow prisms soluble in concentrated sulfuric acid with a blueish red, in piperidine with a yellow coloration.

5 parts by weight of this condensation product are heated with a mixture of 5 parts by weight of sodium chloride and 20 parts by weight of anhydrous aluminiumchloride as described in Example 1. A yellowish brown compound is thus obtainable, dissolving in strong sulfuric acid with a brownish red coloration and with a greenish fluorescence.

*Example 4.*—20 to 25 parts by weight of perimidone are slowly added into 50 parts by weight of m-nitrobenzoylchloride and the mixture is then slowly heated up to 230° C. until the melt solidifies. After cooling the reaction mass is washed with alcohol and recrystallized from nitrobenzene. Brownish yellow crystals are thus obtained which dissolve in strong sulfuric acid with a clear violet red coloration.

By reacting upon this condensation product with a mixture of anhydrous aluminiumchloride and sodium chloride, according to the directions given in Example 1, a yellowish brown compound is obtained soluble in strong sulfuric acid with a cherry-red coloration and without fluorescence.

We claim:

1. Process, which comprises reacting upon a compound obtainable by reacting upon perimidone with an aromatic carboxylic acid halide, with anhydrous aluminiumchloride.

2. Process, which comprises reacting upon a compound obtainable by reacting upon perimidone with an aromatic carboxylic acid halide, with a mixture of anhydrous aluminiumchloride and an alkali metalchloride at a temperature of about 150–170° C.

3. Process, which comprises reacting upon the compound obtainable by reacting upon perimidone with a chloride of an aromatic carboxylic acid, with anhydrous aluminiumchloride.

4. Process, which comprises reacting upon the compound obtainable by reacting upon perimidone with a chloride of an aromatic carboxylic acid, with a mixture of anhydrous aluminiumchloride and an alkali metalchloride at a temperature of about 150–170° C.

5. Process, which comprises reacting upon a compound obtainable by reacting upon perimidone with benzoylchloride, with a mixture of anhydrous aluminiumchloride and sodiumchloride at a temperature of about 150–170° C.

6. The products being obtainable according to the process claimed in claim 1, said products forming yellow to red crystals, difficultly soluble in the usual organic solvents, soluble in strong sulfuric acid with yellow to red colorations.

7. The products being obtainable according to process claimed in claim 4, said products forming yellow to red crystals, difficultly soluble in the usual organic solvents, soluble in strong sulfuric acid with yellow to red colorations.

8. The product of the probable formula:

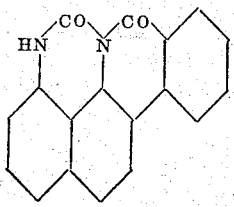

said product forming yellow needles, soluble in strong sulfuric acid with a yellow coloration and with a powerful green fluorescence.

In testimony whereof we have hereunto set our hands.

WALTER MIEG. [L. S.]
RUDOLF HEIDENREICH. [L. S.]